Oct. 7, 1924.　　　　　　　　　　　　　　　　　　　　　1,511,055
J. L. ENTWISTLE
CIRCUIT CLOSER FOR CAR DOORWAYS
Filed Sept. 29, 1921
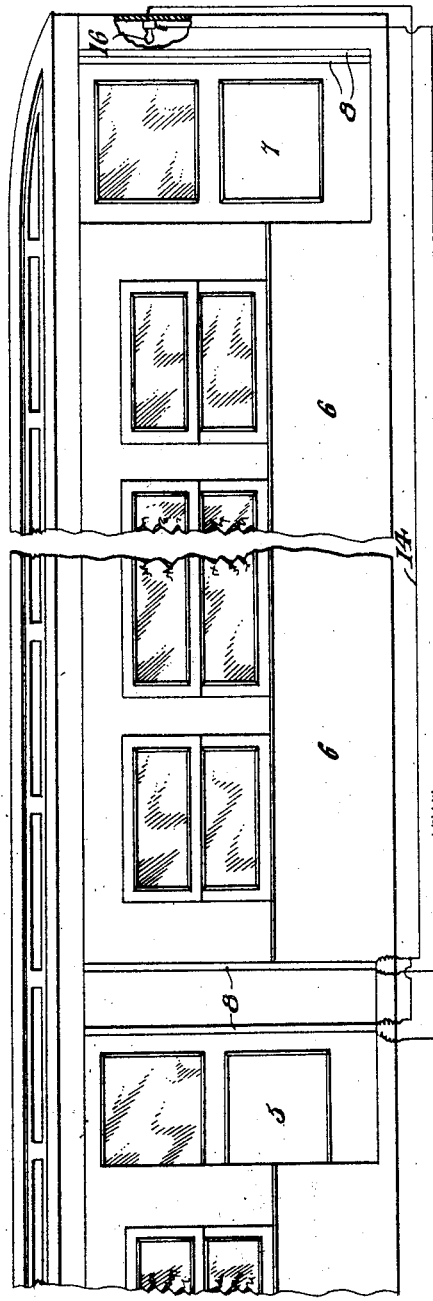
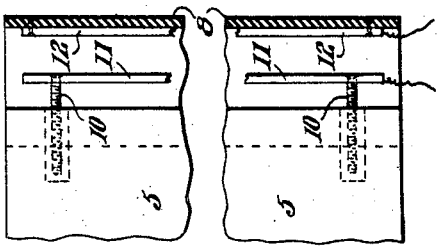
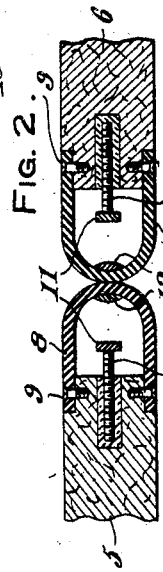
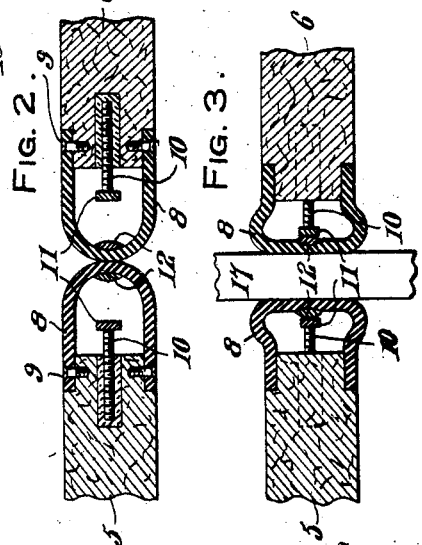
Inventor
James L. Entwistle
By F. H. L. Bryant
Attorney Patented Oct. 7, 1924.

1,511,055

UNITED STATES PATENT OFFICE.

JAMES L. ENTWISTLE, OF CENTRAL FALLS, RHODE ISLAND.

CIRCUIT CLOSER FOR CAR DOORWAYS.

Application filed September 29, 1921. Serial No. 504,251.

*To all whom it may concern:*

Be it known that I, JAMES L. ENTWISTLE, a citizen of the United States of America, residing at Central Falls, in the county of Providence and State of Rhode Island, have invented certain new and useful Improvements in Circuit Closers for Car Doorways, of which the following is a specification.

This invention relates to certain new and useful improvements in circuit closers for car doorways particularly adapted for use in a signal system adapted to indicate in the motorman's cab of a car or train of cars when a person or other obstruction is located between a door and the adjacent side of its doorway.

It is well known that many persons are killed and injured yearly by reason of being caught between the door frame and door of a car when the door is prematurely closed and the car started.

The primary object of the present invention is to provide improved means for preventing occurrence of these accidents including a novel circuit closer for use in a signal circuit and associated with the door and door frame.

Another object of the invention is to provide a device of the above kind comprising a collapsible bumper for car doors and strip contacts within said bumpers, one of which is flexible in nature so as to be flexed into engagement with the other contact when the door is closed with an obstruction between the door frame and any part of the adjacent edge of the door.

With these general objects in view and others that will appear as the nature of the invention is better understood, the same consists in the novel form, combination and arrangement of parts hereinafter more fully described and shown in the accompanying drawings, in which like characters of reference indicate corresponding parts throughout the several views.

In the drawings,

Figure 1 is a view partly broken away showing a car in side elevation with parts removed and with the signalling circuit diagrammatically illustrated, Figure 2 is a fragment horizontal sectional view taken through the door and door frame when the door is closed and without an obstruction therebetween, Figure 3 is a view similar to Figure 2 taken on a different horizontal plane and with an obstruction between the frame and the door, and Figure 4 is a fragmentary view partly in vertical section and partly in side elevation of the car door shown in the other figures.

Referring more in detail to the several views, the doors 5 of usual street, subway, or elevated, railway cars 6 are usually of the sliding type and operated by mechanical or other means in a well known manner for opening and closing under control of a motorman standing in the cab 7.

The present invention aims to provide means for warning the motorman when an obstruction is placed between the door frame and the door when the latter is closed so that said obstruction may be removed before the car is started for avoiding injury and death to persons as well as damage to the car and surroundings thereof.

As shown in the several views, the invention contemplates the provision of a collapsible bumper 8 upon the meeting edges of the door and door frame or upon either one of the same so that when the door is closed under normal conditions, said bumper or bumpers will not be collapsed but will effectively close the doorway. This collapsible bumper may be of any well known or preferred construction but preferably consists of a strip of rubber or other flexible material of U-shaped form in cross section and of a length substantially equal to the height of the door frame or door with the edges of said bumper strip secured to the frame or door by means of screws 9. As the construction of the bumper and circuit closing means is identical whether employed with the door or door frame, the description of one will suffice.

The door or door frame may be provided with a plurality of projecting screws 10 at the edge of the same through which a vertical strip of conducting material 11 is secured, said strip 11 extending longitudinally within the space interiorly of the bumper from top to bottom. Another strip contact 12 is fastened to the bumper 8 in line with the strip 11, preferably against the inner face of the same at its outer end, and the strip 12 is flexible so that the same may be flexed into engagement with the strip 11 upon collapsing of the bumper at any point between the ends therof.

In the use of the present circuit closer, the strips may be connected by means of wires 13 and 14 with a battery 15 or other source of electricity and to a suitable indicating lamp or enunciator 16 mounted in the cab of the car near the motorman. With this arrangement, it will be seen that upon closing of the door with no obstruction between the same and the frame, the bumper will not be collapsed and the contacts 11 and 12 will accordingly not be engaged so that the motorman will know that it is safe to start the car. On the other hand, should an obstruction such as is diagrammatically illustrated at 17, be placed between the adjacent edges of the door and door frame so as to cause collapsing of a portion of one or both of the bumpers, at least one of the contacts 12 will be caused to engage one of the contacts 11 so as to close the circuit to the signal or indicator 16, thereby warning the motorman not to start the car.

From the foregoing description, it will be seen that numerous accidents can be effectively avoided by the use of the present device and it will also be seen that the construction is of such a simple and durable nature that the same will meet with the requirements for a successful commercial use.

While I have shown and described strip contacts for accomplishing the desired result, it will be understood that the invention is not limited to the use of the same as equivalent circuit closing contacts of different specific form may be used such as a series of contacts distributed throughout the length of the collapsible bumpers.

It will also be understood that the circuit closer might, by means of the proper use of a relay, prevent the operation of the usual starting signal which is normally automatically given when all of the doors are closed, in addition to giving a signal to the motorman, that an obstruction is positioned between the door and its frame. The essential and primary object of the invention may be stated as the provision of means for automatically closing a signal or other circuit upon the placing of an obstruction between any portions of the adjacent edges of a sliding car door and its frame.

What is claimed as new is:

1. In combination with a sliding car door, a collapsible bumper of U-shape in cross section secured along one vertical edge of the door from top to bottom of the latter, a stationary strip contact extending substantially from top to bottom of the door and attached to the edge of the latter within said bumper, and a second strip contact extending substantially from top to bottom of the bumper and secured to the inner face of the same outwardly of the first named contact.

2. In combination with a sliding car door, a collapsible bumper of U-shape in cross-section secured along one vertical edge of the door, a contact strip secured to the inner face and extending longitudinally of the bumper, and a second contact strip longitudinally adjustably secured to the door edge inwardly of the first mentioned strip.

In testimony whereof I affix my signature.

JAMES L. ENTWISTLE.